United States Patent
Su et al.

(10) Patent No.: US 9,739,602 B2
(45) Date of Patent: Aug. 22, 2017

(54) METHOD FOR MEASURING THREE-DIMENSIONAL PROFILE OF SPECULAR OBJECT BY FRINGE PROJECTION

(71) Applicant: National Sun Yat-sen University, Kaohsiung (TW)

(72) Inventors: Wei-Hung Su, Kaohsiung (TW); Bo-Chin Huang, Kaohsiung (TW)

(73) Assignee: NATIONAL SUN YAT-SEN UNIVERSITY, Kaohsiung (TW)

(*) Notice: Subject to any disclaimer, the term of this patent is extended or adjusted under 35 U.S.C. 154(b) by 0 days.

(21) Appl. No.: 14/825,185

(22) Filed: Aug. 13, 2015

(65) Prior Publication Data
US 2016/0238379 A1 Aug. 18, 2016

(30) Foreign Application Priority Data
Feb. 17, 2015 (TW) .................................. 104105695

(51) Int. Cl.
*G01B 9/021* (2006.01)
*G01B 11/25* (2006.01)

(52) U.S. Cl.
CPC .................................. *G01B 11/25* (2013.01)

(58) Field of Classification Search
CPC . G01B 11/2441; G01B 11/25; G01B 11/2531; G01B 9/02047; G01B 9/021;
(Continued)

(56) References Cited

U.S. PATENT DOCUMENTS 3,952,150 A * 4/1976 Gerardin .............. G01B 11/167
348/129
6,509,559 B1 * 1/2003 Ulrich .................... G01B 11/25
250/237 G
(Continued)

FOREIGN PATENT DOCUMENTS

CN 101691997 A 4/2010
CN 102636131 A 8/2012
(Continued)

OTHER PUBLICATIONS

Su, Wei-Hung & Cheng, Nei-Jen. (2014). Projected fringe profilometry for non-diffusive objects, Photonic Fiber and Crystal Devices: Advances in Materials and Innovations in Device Applications VIII, edited by Shithuo Yin, Ruyan Guo, Proc. of SPIE vol. 9200 920011-1, California, United States, Aug. 17, 2014.

*Primary Examiner* — Tarifur Chowdhury
*Assistant Examiner* — Jonathon Cook
(74) *Attorney, Agent, or Firm* — Soroker Agmon Nordman

(57) ABSTRACT

A method using fringe projection to describe the three-dimensional profile of a specular object is presented and has steps of: providing a diffraction grating formed by exposing and developing a hologram and having at least two sets of interference fringes; guiding a conjugate of the reference light generated from a conjugate light source to pass through the diffraction grating, in order to generate a real image with a long depth of field, a wide convergent angle, and a sinusoidal distribution light intensity; projecting this real image onto an inspected specular object; using an image capture device to capture the intensity distribution of the real image on the inspected specular object so as to obtain an image signal; and using an image processor to analyze the image signal so as to identify the profile of the inspected specular object.

7 Claims, 3 Drawing Sheets

(58) Field of Classification Search
CPC ....... G01B 9/023; G01B 9/025; G01M 11/00; G01M 11/0271; G03H 2001/0033; G02B 27/4227; G02B 27/60; G02B 2027/0109
USPC ................................ 356/458, 603–605, 612
See application file for complete search history.

(56) References Cited

U.S. PATENT DOCUMENTS

| | | | |
|---|---|---|---|
| 7,605,926 B1* | 10/2009 | Hetzler | G01M 11/0221 356/515 |
| 8,941,837 B1* | 1/2015 | Olczak | G01B 9/021 356/457 |
| 2007/0279639 A1* | 12/2007 | Hu | G01B 11/2441 356/512 |
| 2010/0092040 A1* | 4/2010 | Fischer | G01B 11/25 382/106 |
| 2013/0107032 A1* | 5/2013 | Yamada | B25J 11/00 348/86 |
| 2013/0271801 A1 | 10/2013 | Yao | |
| 2013/0301909 A1 | 11/2013 | Sato | |

FOREIGN PATENT DOCUMENTS

| | | |
|---|---|---|
| TW | 200806953 A | 2/2008 |
| TW | 201341986 A | 10/2013 |
| WO | 2012099220 A1 | 7/2012 |

* cited by examiner

METHOD FOR MEASURING THREE-DIMENSIONAL PROFILE OF SPECULAR OBJECT BY FRINGE PROJECTION

CROSS REFERENCE TO RELATED APPLICATIONS

This application claims the priority of Taiwan Patent Application No. 104105695, filed on Feb. 17, 2015. This invention is partly disclosed in a thesis entitled "Projected fringe profilometry for non-diffusive objects" on Aug. 17, 2014 completed by Wei-Hung Su.

FIELD OF THE INVENTION

The present invention relates to a method for measuring the profile of a specular object, and more particularly to a method for measuring the 3D profile of a specular object by fringe projections.

BACKGROUND OF THE INVENTION

The existing fringe projection technique is only adapted for diffusive objects. For specular objects complying with the law of reflection, only a part of the surface with the fringes can be observed. Reflected light from other regions cannot project to the image capture system, resulting in deletion of part of the image data. On the other hand, the reflected light which projects to the image capture system has an exorbitantly high light intensity, so as to form an image with a saturation greyscale value, and further to make the fringe image too bright or form a bad contrast ratio.

Therefore, it is necessary to provide a method for measuring a specular object by fringe projection to solve the above described problems.

SUMMARY OF THE INVENTION

This technical improvement of a traditional architecture fringe projection optical profiler can effectively observe a complete image projected onto a specular object, and can effectively avoid a portion of the image being too bright, or the contrast ratio being too bad. Further, since the present technique is also applicable to a general diffusion object with a large depth measurement range, measurement can be carried out without scanning.

To achieve the above object, the present invention provides a method for measuring a specular object by fringe projection, comprising steps of: (S1) using a diffusion plane to receive a beam which contains fringe signal, and generating a diffusion beam according to a diffusion effect of the diffusion plane; (S2) using a hologram to receive a reference beam and the diffusion beam, wherein the reference beam interferes with the diffusion beam on the hologram to generate a set of interfere fringes exposed on the hologram; (S3) moving the diffusion plane to add a predetermined distance between the hologram and the diffusion plate; (S4) repeating the steps (S1) to (S3) at least one time to use at least two sets of diffusion beams with different depths to generate at least two sets of interfere fringes on the hologram; (S5) developing and fixing the at least two sets of interfere fringes on the hologram to form a diffraction grating; (S6) arranging the diffraction grating with an image processor, a conjugate light source and an image capture device to form a fringe projection profilometry; (S7) providing a conjugate of the reference light generated from the conjugate light source to pass through the diffraction grating, so as to reconstruct a real image, wherein the real image is a fringe image which has a sinusoidal distribution light intensity; and then projecting the fringe image onto an inspected specular object; (S8) using the image capture device to capture a diffusion image on the inspected object to obtain an image signal; and (S9) using the image processor to analyze the image signal, so as to identify the profile of the inspected specular object.

In one embodiment of the present invention, the fringe image is a long depth of focus (DOF) fringe image which has a sinusoidal distribution light intensity.

In one embodiment of the present invention, at the step (S4), the number of repeating the steps (S1) to (S3) is greater than two, so as to form as least three sets of interfere fringes on the hologram.

In one embodiment of the present invention, the step (S1) further comprises steps of: (S11) emitting a laser beam by a laser light source; and (S12) dividing the laser beam into a first laser beam and a second laser beam by a beam splitter.

In one embodiment of the present invention, after the step (S12), the method further comprises a step of: (S13) reflecting the first laser beam by a first reflection mirror, and then emitting the first laser beam into a first spatial filter, so as to filter and expand the first laser beam.

In one embodiment of the present invention, after the step (S13), the method further comprises a step of: (S14) generating a first spherical wave after the first laser beam passes through the first spatial filter, wherein the first spherical wave then passes through a first lens and a predetermined fringe grating sequentially to generate a fringe beam, the fringe beam forms an inverted real image on the diffusion plane through a second lens and a second reflection mirror, and a reflection light of the inverted real image on the diffusion plane forms the diffusion beam based on the diffusion effect.

In one embodiment of the present invention, after the step (S12), the method further comprises steps of: (S21) emitting the second laser beam into a second spatial filter, so as to filter and expand the second laser beam; and (S22) generating a second spherical wave after the second laser beam passes through the second spatial filter, wherein the second spherical wave then passes through a third lens to form a planar wave, and the planar wave is reflected by a third reflection mirror so as to form the reference beam.

To achieve the above object, the present invention further provides a method for measuring a specular object by fringe projection, comprising steps of: (P1) providing a diffraction grating formed by exposing and developing a hologram, wherein the diffraction grating has at least two interfere fringes; (P2) arranging the diffraction grating with an image processor, a conjugate light source and an image capture device to form a fringe projection profilometry; (P3) providing a conjugate of the reference light generated from the conjugate light source to pass through the diffraction grating, so as to generate a fringe in which has a sinusoidal distribution light intensity, wherein the fringe image is a real image; and then projecting the fringe image onto an inspected object; (P4) using the image capture device to capture a reconstructed image on the inspected object to obtain an image signal; and (P5) using the image processor to analyze the image signal, so as to identify the profile of the inspected object.

In one embodiment of the present invention, the diffraction grating is formed by exposing and developing the hologram using at least three sets of interfere fringes sequentially.

In one embodiment of the present invention, the inspected object is a specular object.

In summary, in optical industries, shape, surface roughness, curvature, scratches, and defect detection of mirrors etc., are needed to detect the shape of the specular surface. In optical communications, fiber appearance, breaking breakpoint identification, etc., are also related to the shape measurement of specular objects. In metal processing, the shape of finished products and surface flatness are needed to make verification. In addition, the semiconductor industry is required to measure the surface profile of the wafer or package. Other applications such as solder ball height and contour of a circuit board, and in the aerospace industry, a quality control of wings and propellers, etc., are needed to measure or identify the shape of specular objects. The method for measuring a specular object by fringe projection of the present invention is adapted for the above situations and has a contribution for industrial applicability.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

A large sized hologram is the key projection element in the present invention. The images restructured by the diffracted light will converge into a real image, and that real image has a long depth of field (DOF), a diffusion result, and a sinusoidal distribution light intensity. The restructured image has a long depth of field, so that is not needed to make vertical scanning or multiple projections, and the fringes can be projected onto a specular object completely. In addition, the restructured sinusoidal image has a diffusion result, so that if the sinusoidal image is projected onto a specular object, a complete and no partial deletion image can be captured on any position.

Figure 1:
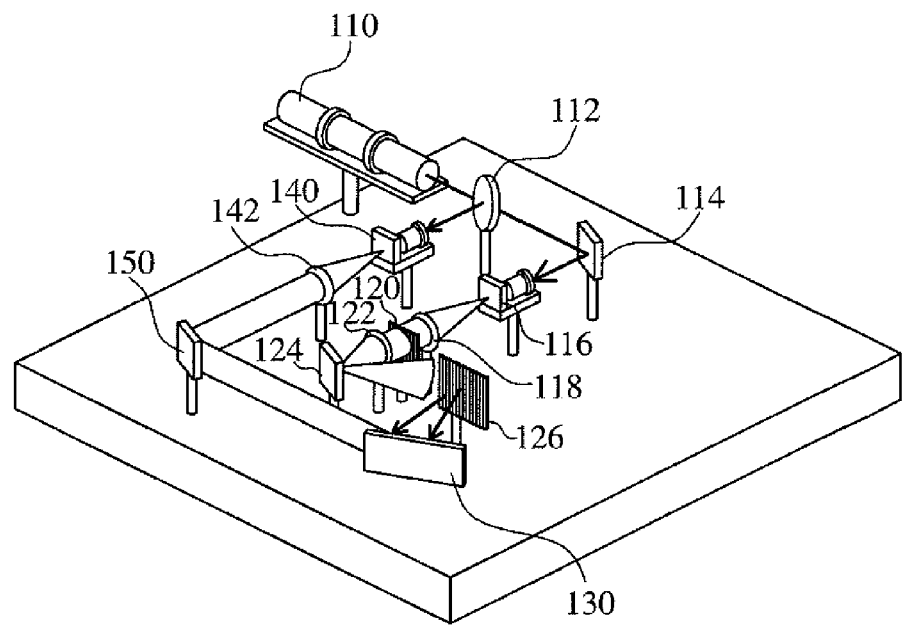
FIG. 1 is a diagram of a hologram production of a method for measuring a specular object by fringe projection according to a first embodiment of the present invention.

Refer to FIG. 1, a large sized hologram is the key projection element in the present invention. FIG. 1 is a diagram of a hologram production of a method for measuring a specular object by fringe projection according to a first embodiment of the present invention. Firstly, a laser light source 110 emits a laser beam, and a spectroscope 112 divides the laser beam into a first laser beam and a second laser beam. A first reflection mirror 114 reflects the first laser beam, and then the first laser beam is emitted into a first spatial filter 116 to filter and expand the first laser beam, so as to generate a first spherical wave. The first spherical wave then passes through a first lens 118 and a predetermined fringe grating 120 sequentially to generate a fringe beam. The fringe beam forms an inverted real image on the diffusion plane through a second lens 122 and a second reflection mirror 124. A reflection light of the inverted real image on the diffusion plane 126 forms the diffusion beam based on the diffusion effect. For example, the diffusion plane 126 can be a white paper.

In addition, the second laser beam divided from the beam splitter 112 is emitted into a second spatial filter 140 to filter and expand the second laser beam, so as to generate a second spherical wave. The second spherical wave is then passed through a third lens 142 to form a planar wave, and the planar wave is reflected by a third reflection mirror 150 so as to form the reference beam.

Figure 2:
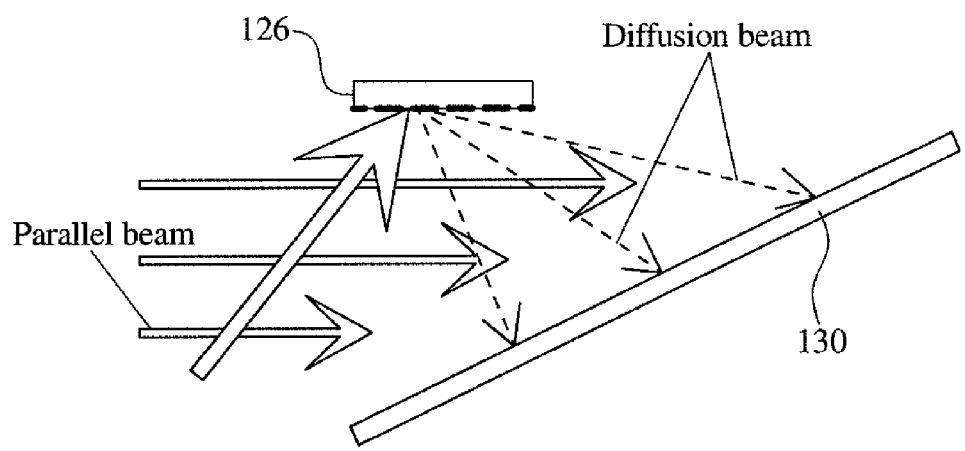
FIG. 2 is a diagram of a hologram recorded interference between a reference beam and a diffusion beam according to a first embodiment of the present invention.

Refer to FIG. 2, which is a diagram of hologram recorded interference between a reference beam and a diffusion beam according to a first embodiment of the present invention. In FIG. 2, the hologram 130 receives a diffusion beam generated from the first laser beam and a reference beam generated from the second laser beam. The hologram 130 is placed on an area which offers the reference beam and the diffusion beam executes interference, so as to form a set of interference fringes exposed on the hologram 130.

Figure 3:
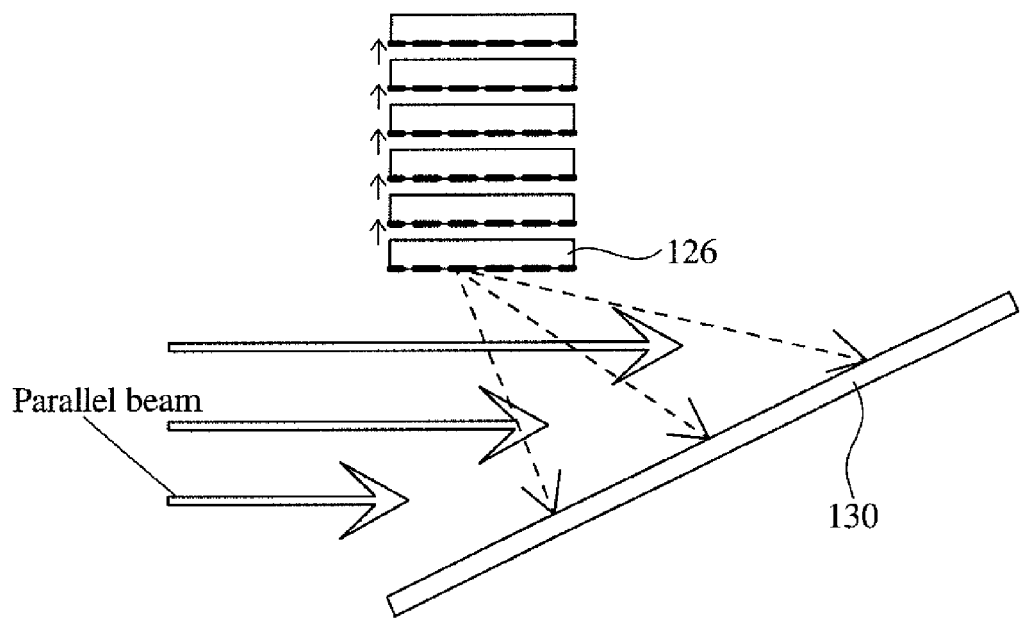
FIG. 3 is a diagram of a hologram recorded an interference between a reference beam and different diffusion beams according to a first embodiment of the present invention.

Refer to FIG. 3, which is a diagram of a hologram recording an interference between a reference beam and different diffusion beams according to a first embodiment of the present invention. The present invention uses a moving structure (not illustrated) to move the diffusion plane 126, so as to add a default distance between the diffusion plane 126 and the hologram 130. Next, the hologram 130 is executed to receive the reference beam and a newly generated diffusion beam again so as to make the reference beam and the newly generated diffusion beam to interfere with each other on the hologram 130, and then another new set of interference fringes is exposed on the hologram 130. The present invention uses at least two diffusion beams from different depths to form at least two set of interference fringes on the hologram 130. In addition, the present invention moves the diffusion plane 126 to generate a new diffusion light. The hologram 130 is executed to receive the reference beam and a newly generated diffusion beam again. The present invention makes that the interference frequency is greater than two, so as to form at least three sets of interference fringes. The present invention moves the diffusion plane 126 repeatedly to let the diffusion beams with different depth interfere with the same reference beam successively and then be exposed on the hologram 130.

Figure 4:
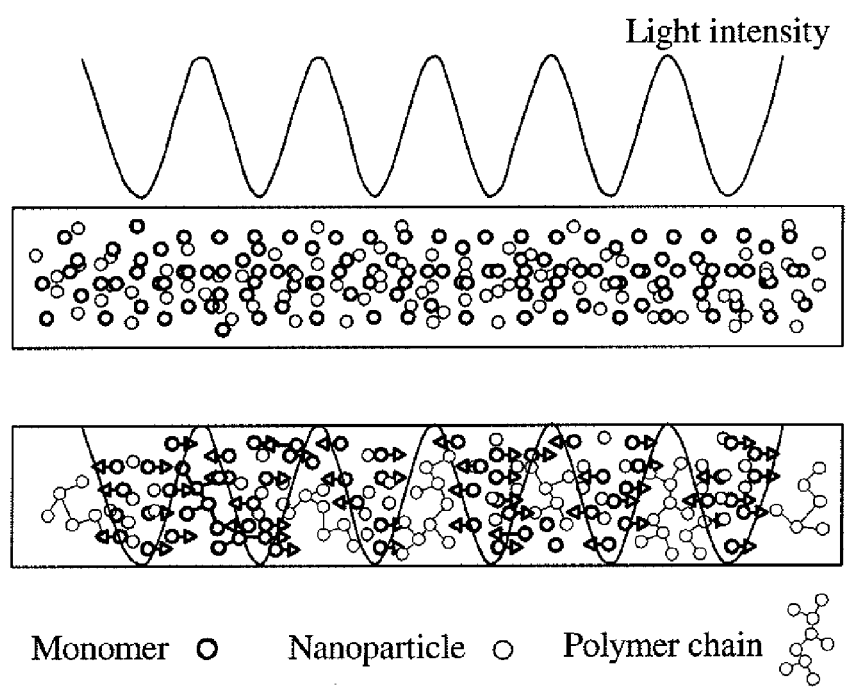
FIG. 4 is a diagram of a diffraction grating forming principle according to a first embodiment of the present invention.

Refer to FIG. 4, which is a diagram of a diffraction grating forming principle according to a first embodiment of the present invention. A hologram has a variety of known form, common holograms are, for example silver halide films, photo-polymers, thermoplastic films, and so on. FIG. 4 is a non-limiting example, in which a hologram after exposure to light, resulting holographic film initiators dissociated to generate free radicals, resulting in the photoreactive hologram film monomers in the bright area (area to be irradiated with the light) chain polymerization reaction occurs, and causes the photoreactive monomers to move from the dark region (the region that is not irradiated with the light) to light areas. At the same time, photoreaction insensitive (silver) nano-particles move in reverse from bright areas to dark areas. Upon completion of the exposure, developing fixed by the developer, distinct (silver) nano-particles are formed of different density gradient distributions. When a subsequent conjugation light passes through a hologram, which will be a light has a sinusoidal intensity distribution. At this time, the hologram 130 can form a diffraction grating which has a sinusoidal distribution refraction index. The difference between the first embodiment and the existing hologram exposure development process is: The present invention moves the diffusion plane 126 repeatedly to let the diffusion beams with different depth interfere with the same reference beam successively and then be exposed on the hologram 130. Developing and fixing the at least two set of interfere fringes on the hologram to form a diffraction grating so as to execute the next steps of measuring object shape by fringe projection. It is worth noting that, for the example as given FIG. 4, after the above steps, the material of the hologram 130 is still transparent. The hologram 130 absorbs at least two set of interference fringes, and the interference fringes are not formed to a visible pattern of light and dark fringes, but the refractive index of the interference fringes varies with a light intensity distribution. The distribution period of the interference fringes is the same magnitude as the wavelength of the laser light, and that is about 1 μm, so the naked eye and cannot see the interference fringes. In addition, the hologram 130 is not limited to the example of FIG. 4, and some other form of photosensitive polymeric materials of the hologram do not require a developing process, but the need for fixing; some materials after exposure, developing, fixing, and after washing, do not require bleaching, e.g. silver halide film. The above-described developing and fixing procedure only applies to the non-limiting example of FIG. 4.

Figure 5:
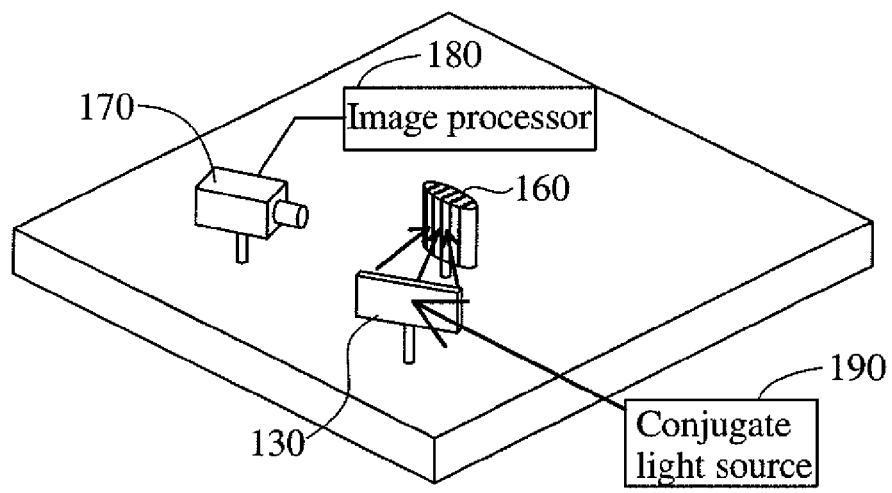
FIG. 5 describes a device for measuring a specular object by fringe projection according to a first embodiment of the present invention.
Figure 6:
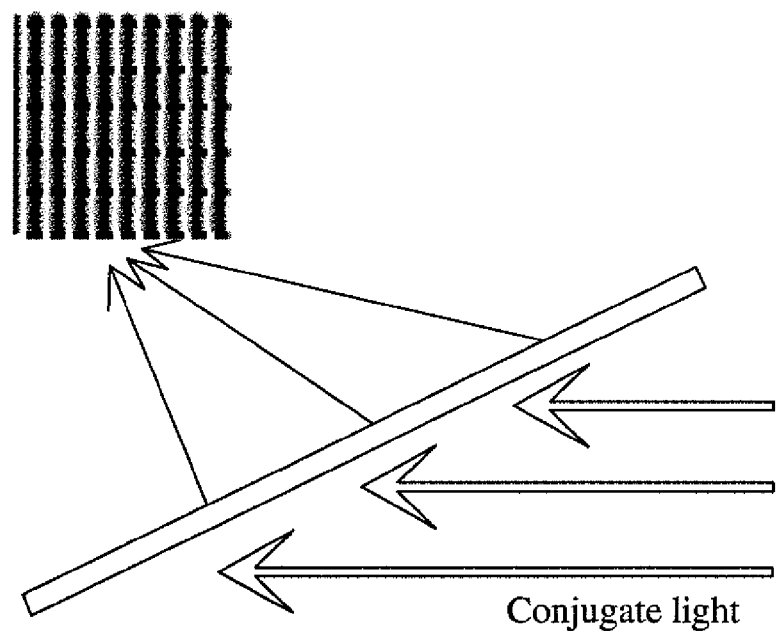
FIG. 6 is an enlarged view of the implementation of components of the method for measuring a specular object by fringe projection according to a first embodiment of the present invention.

Refer to FIG. 5, which describes a device for measuring a specular object by fringe projection according to a first embodiment of the present invention. The diffraction grating 130 is arranged with an image capture device 170, a conjugate light source 190, and an image processor 180 to form a fringe projection profilometry. The diffraction grating 130 is formed by developing the hologram using at least six set of interfere fringes. Firstly, a conjugate of the reference light generated from the conjugate light source 190 is provided to pass through the diffraction grating 130, so as to generate a fringe image which has a sinusoidal distribution light intensity, wherein the fringe image is a real image; and then projecting the fringe image onto an inspected object 160. In the present invention, the inspected object 160 is a specular object. The fringe image is a long depth of field fringe image which has a sinusoidal distribution light intensity and a large convergence angle.

Next, the image capture device 170 is used to capture a diffusion image on the inspected object 160 to obtain an image signal. The image processor 180 is used to analyze the image signal, so as to identify the profile of the inspected specular object 160.

The present invention disposes a large diffraction grating, and lets the sinusoidal pattern generated by emitting the conjugate of the reference light to the hologram to project onto the specular object, so as to execute the measuring of the specular object. The diffraction grating is produced by the hologram. The object light is from a sinusoidal pattern from the diffusion plane. The hologram repeatedly records that the interference fringes of diffusion object lights generated by varying the diffusion plane in different position interferes with the same one reference light by the multiple exposure procedures. The grating has a penetrating property, and the reading light diffracts into real images with a plurality of different positions. The result equals to form a long depth of field fringe image which has a sinusoidal distribution light intensity and a large convergence angle. Therefore, while projecting onto the specular object, the reflected light has a characteristic of diverging with a large angle, so as to make the fringes visible at each observation position. The present invention takes multiple exposures to increase the depth of focus of the reconstruction image. The inspected specular object is placed within the imaging range, without scanning the depth direction, the global topology shape measurement is executed. In addition, the size of the hologram is relatively large, the directions of the projected fringes on the hologram are from diffraction lights with different angles, so as to solve the shadow problems caused by tilting the projector in a traditional fringe projection system.

A method for measuring a specular object by fringe projection of the present invention is also adapted for diffusion objects. The image of diffusion objects may be interfered with by laser speckles; however, the speckle spectral distribution is different from the designed fringe spectral distribution, so that will not affect the measurement of the exact value.

As described above, in optical industries such as shape, surface roughness, curvature, scratches, and defects detection of mirror etc., are needed to detect the shape of the specular surface. In optical communications, such as fiber appearance, breaking breakpoint identification, etc., are also related to the shape measurement of specular objects. In metal processing, such as the shape of finished products and surface flatness are needed to make verification. In addition, the semiconductor industry is required to measure the surface profile of the wafer or package. Other applications such as solder ball height and contour of a circuit board, and the aerospace industry such as a quality control of wing and propeller, etc., are needed to measure or identify the shape of specular objects. The method for measuring a specular object by fringe projection of the present invention is adapted for the above situations and has a contribution for industrial applicability.

In summary, the present invention has been disclosed with preferred embodiments thereof, but the above described preferred embodiments are not intended to limit the present invention. Those who are skilled in the art can make many changes and modifications to the described embodiment which can be carried out without departing from the scope and the spirit of the invention that is intended to be limited only by the appended claims.

What is claimed is:

1. A method for measuring a specular object by fringe projection, comprising steps of:
   (S1) using a diffusion plane to receive a beam which has a fringe data, and generating a diffusion beam according to a diffusion effect of the diffusion plane;
   (S2) using a hologram to receive a reference beam and the diffusion beam, wherein the reference beam interferes with the diffusion beam on the hologram to generate a set of interfere fringes exposed on the hologram;

(S3) moving the diffusion plane to add a predetermined distance between the hologram and the diffusion plate;

(S4) repeating the steps (S1) to (S3) at least one time to use at least two set of diffusion beams with different depths to generate at least two sets of interfere fringes on the hologram;

(S5) developing and fixing the at least two sets of interfere fringes on the hologram to form a diffraction grating;

(S6) arranging the diffraction grating with an image processor, a conjugate light source and an image capture device to form a fringe projection profilometry;

(S7) providing a conjugate of reference light generated from the conjugate light source to pass through the diffraction grating, so as to reconstruct a real image, wherein the real image is a fringe image which has a sinusoidal distribution light intensity; and then projecting the fringe image onto an inspected specular object;

(S8) using the image capture device to capture a diffusion image on the inspected specular object to obtain an image signal; and (S9) using the image processor to analyze the image signal, so as to identify the profile of the inspected specular object.

2. The method for measuring a specular object by fringe projection according to claim 1, wherein the fringe image is a long depth of field fringe image which has a sinusoidal distribution light intensity.

3. The method for measuring a specular object by fringe projection according to claim 1, wherein at the step (S4), the number of repeating the steps (S1) to (S3) is greater than five, so as to form as least six sets of interfere fringes on the hologram.

4. The method for measuring a specular object by fringe projection according to claim 1, wherein the step (S1) further comprises steps of:

(S11) emitting a laser beam by a laser light source; and (S12) dividing the laser beam into a first laser beam and a second laser beam by a beam splitter.

5. The method for measuring a specular object by fringe projection according to claim 4, wherein after the step (S12), the method further comprises a step of:

(S13) reflecting the first laser beam by a first reflection mirror, and then emitting, the first laser beam into a first spatial filter, so as to filter and expand the first laser beam.

6. The method for measuring a specular object by fringe projection according to claim 5, wherein after the step (S13), the method further comprises a step of:

(S14) generating a first spherical wave after the first laser beam passes through the first spatial filter, wherein the first spherical wave then passes through a first lens and a predetermined fringe grating sequentially to generate a fringe beam, the fringe beam forms an inverted real image on the diffusion plane through a second lens and a second reflection minor, and a reflection light of the inverted real image on the diffusion plane forms the diffusion beam based on the diffusion effect.

7. The method for measuring a specular object by fringe projection according to claim 4, wherein after the step (S12) the method further comprises steps of:

(S21) emitting the second laser beam into a second spatial filter, so as to filter and expand the second laser beam; and (S22) generating a second spherical wave after the second laser beam passes through the second spatial filter, wherein the second spherical wave then passed through a third lens to form a planar wave, and the planar wave is reflected by a third reflection mirror so as to form the reference beam.

* * * * *